(No Model.)

E. L. PRALL.
MOTOR FOR CHURNS.

No. 358,569. Patented Mar. 1, 1887.

Witnesses:
W. A. Burchard
Jos. Forrest

Inventor:
Effie L. Prall
By her Attorneys
Edson Bros.

UNITED STATES PATENT OFFICE.

EFFIE L. PRALL, OF WELLINGTON, KANSAS.

MOTOR FOR CHURNS.

SPECIFICATION forming part of Letters Patent No. 358,569, dated March 1, 1887.

Application filed March 6, 1886. Serial No. 194,314. (No model.)

*To all whom it may concern:*

Be it known that I, EFFIE L. PRALL, a citizen of the United States, residing at Wellington, in the county of Sumner and State of Kansas, have invented certain new and useful Improvements in Motors for Churns, of which the following is a specification, reference being had therein to the accompanying drawings.

My invention relates to improvements in churns; and the novelty consists in the construction, arrangement, and combination of parts, substantially as hereinafter described, and specifically pointed out in the claims.

Figure 1:
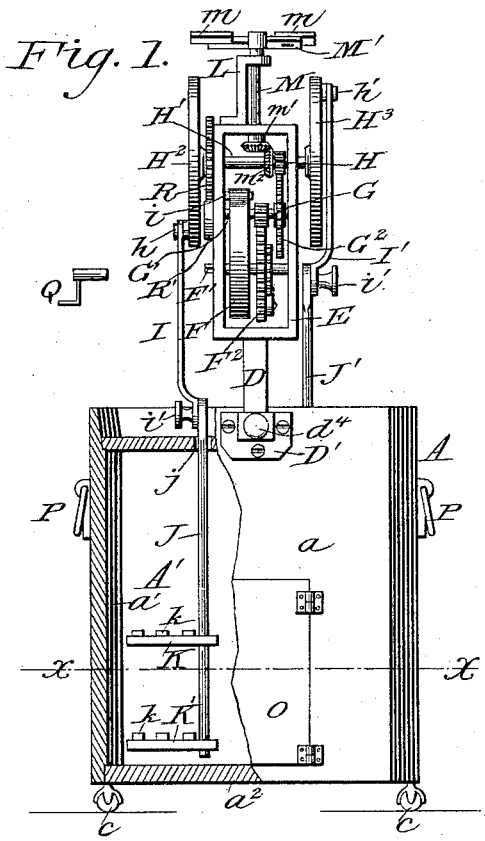
Figure 2:
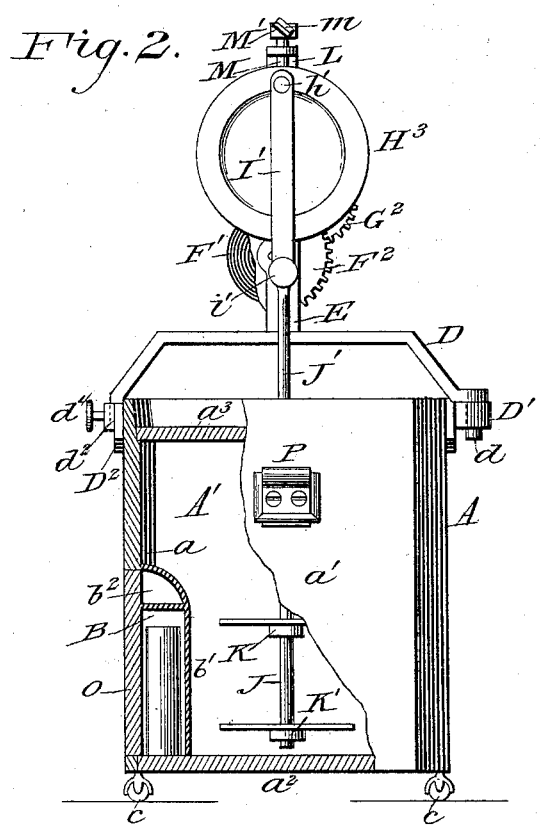
Figure 3:
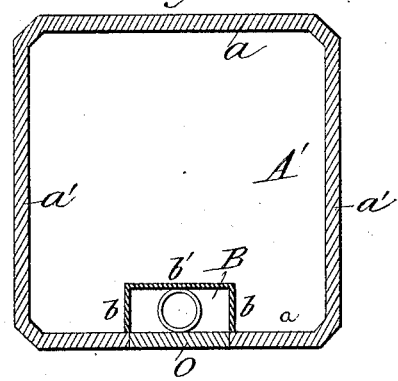
Figures 4, 5:
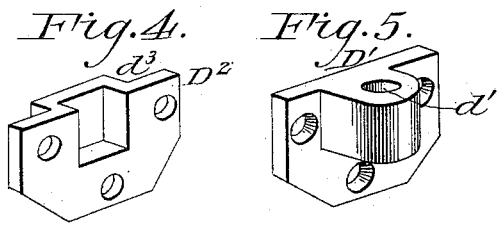

In the drawings, Figure 1 is a front elevation, partly in section, of a churn embodying my improvements. Fig. 2 is a side elevation, partly in section, thereof. Fig. 3 is a horizontal section on the line $x\ x$ of Fig. 1, with the dashers removed. Figs. 4 and 5 represent detached detail views of parts of the machine.

Referring to the drawings, in which similar letters of reference denote similar parts, A designates the body of the churn, preferably rectangular in cross-section, having sides $a\ a'$, bottom $a^2$, removable cover $a^3$, and a milk or cream receiving chamber, A'.

B designates a small chamber formed by the walls $b\ b'$ within the churn, near its bottom, as shown in Figs. 2 and 3, for the purpose of receiving a can of hot or cold water, whereby to raise or lower the temperature of the milk or cream within the body of the churn.

$B^2$ designates a small chamber formed at the upper part of the chamber B, to receive a thermometer.

$c$ are rollers secured to the bottom of the churn, at the corners thereof, and D a casting that extends from side to side of the body A, to support a frame, E, wherein the operating mechanism of the churn is mounted, as hereinafter described. The casting D is provided at one end with a downwardly-projecting pivotal pin, $d$, that enters an aperture, $d'$, formed in a casting, D', secured by screws to one side of the churn-body, the opposite end thereof having a tenon, $d^2$, that enters a recess, $d^3$, formed in the rear surface of a casting, $D^2$, secured to the forward side of the churn, where it is held by a set-screw, $d^4$.

E designates a frame secured to the casting D, to receive the operating mechanism. A rotatable shaft, F', is journaled in the sides $e$ of the frame E, and is provided at one end with a coiled spring, F', one end of which is secured to said shaft, while its opposite end is secured to a stud, $i$, projecting inwardly from one of the sides of the frame E.

$F^2$ designates a spur-gear wheel mounted upon the shaft F', as shown. The teeth of the wheel $F^2$ engage and rotate a pinion, G, mounted upon a shaft, G', journaled in the frame E above the shaft F'.

$G^2$ designates a spur-gear wheel mounted upon the shaft G' and rotating therewith, the teeth of which engage with and rotate a pinion, H, mounted upon a shaft, H', journaled in the upper portion of said frame E, and projecting outwardly at each end beyond the sides of said frame.

$H^2\ H^3$ designate balance or crank wheels, which are mounted upon the ends of the shaft H', exteriorly to the sides of the frame E, and are connected by crank-pins $h\ h'$ and pitmen I I' with the dashers J J' of the churn.

$i\ i'$ designate the coupling-screws which connect the pitmen to said dashers.

K K' are the dasher-arms, that operate within the churn, and $k$ transverse bars secured to the upper surface of the arms K K'.

The dasher-rods J J' operate through apertures $j$ in the cover of the churn.

L is a bracket secured to the upper end of the frame E, to support a vertically-rotating shaft, M, that carries at its upper end a horizontally-rotating and motion controlling or balancing fan, M', having adjustable arms $m$. The lower end of the shaft M is provided with a bevel gear-wheel, $m'$, that engages a similar bevel gear-wheel, $m^2$, mounted upon the shaft H'.

O is a hinged door to the chamber B.

P P represent handles secured to the sides of the churn-body near its upper end.

The operation of my improvement is as follows: The spring F is wound up by a key, Q, that is applied to the squared projecting end of the shaft F', and communicates motion through the gear-wheels $F^2$, G, $G^2$, and H, and balance-wheels $H^2\ H^3$ to the dasher-rods J J'. To hold the wheels from rotation I employ a ratchet-wheel, R, and pawl R'. When it is desired to raise the cover $a^3$, the set-screw $d^4$ is loosened and the casting D raised at its end $d^2$ from the casting $D^2$ and swung around on its pivot $d$, the screw-couplings $i$ $i'$, that connect the pitmen I I' with the dasher-rods, being first removed.

I claim—

1. The combination, with the casting D, mounted upon the cream-receiving receptacle A, of the frame E, spring F, gear-wheels $F^2$ G $G^2$ H, bevel gear-wheels $m'$ $m^2$, bracket L, and fan M', as and for the purpose set forth.

2. The combination, with the frame E, having the spring F and train of gearing $F^2$ G $G^2$ H $m'$ $m^2$, bracket L, and fan M', of the pawl and ratchet R R', balance-wheels $H^2$ $H^3$, pitmen I I', and reciprocating shafts J J', substantially as shown and described.

In testimony whereof I affix my signature in presence of two witnesses.

EFFIE L. PRALL.

Witnesses:
J. L. GRIDER,
JNO. T. EGDER.